(12) United States Patent
Strongin et al.

(10) Patent No.: US 7,631,160 B2
(45) Date of Patent: Dec. 8, 2009

(54) METHOD AND APPARATUS FOR SECURING PORTIONS OF MEMORY

(75) Inventors: Geoffrey S. Strongin, Austin, TX (US); Brian C. Barnes, Round Rock, TX (US); Rodney Schmidt, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 2277 days.

(21) Appl. No.: 09/825,905

(22) Filed: Apr. 4, 2001

(65) Prior Publication Data

US 2002/0147916 A1   Oct. 10, 2002

(51) Int. Cl.
G06F 12/00 (2006.01)
G06F 13/00 (2006.01)
G06F 13/28 (2006.01)
G06F 11/30 (2006.01)
G06F 12/14 (2006.01)

(52) U.S. Cl. ...................... 711/163; 713/193
(58) Field of Classification Search ........... 713/193; 711/163
See application file for complete search history.

(56) References Cited

U.S. PATENT DOCUMENTS

| | | | | |
|---|---|---|---|---|
| 3,970,999 A | * | 7/1976 | Elward .................... 711/2 |
| 4,366,537 A | * | 12/1982 | Heller et al. ............. 711/164 |
| 4,430,705 A | * | 2/1984 | Cannavino et al. ....... 711/206 |
| 4,442,484 A | * | 4/1984 | Childs et al. ............. 711/163 |
| 4,500,952 A | * | 2/1985 | Heller et al. ............. 711/206 |
| 4,677,546 A | * | 6/1987 | Freeman et al. .......... 711/203 |
| 4,890,223 A | * | 12/1989 | Cruess et al. ............. 711/207 |
| 5,075,842 A | * | 12/1991 | Lai .......................... 711/152 |
| 5,457,789 A | | 10/1995 | Dietrich, Jr. et al. ..... 395/427 |
| 5,557,771 A | * | 9/1996 | Kawaguchi et al. ...... 711/163 |
| 5,890,189 A | * | 3/1999 | Nozue et al. ............. 711/100 |
| 5,995,750 A | * | 11/1999 | Samson et al. ........... 718/107 |
| 6,148,384 A | * | 11/2000 | Devanagundy et al. ... 711/163 |
| 7,124,170 B1 | * | 10/2006 | Sibert ...................... 709/216 |

OTHER PUBLICATIONS

International Search Report dated Jun. 18, 2003 for International application No. PCT/US02/02846 Filed Feb. 1, 2002.

(Continued)

*Primary Examiner*—Sheng-Jen Tsai
(74) *Attorney, Agent, or Firm*—Williams, Morgan & Amerson, P.C.

(57) ABSTRACT

The present invention provides a method and apparatus for securing portions of a memory. The method includes identifying information for protection and indicating at least one physical address of a memory that houses the information as at least one of read and write disabled. The method includes receiving a request from a program to access the information. The method further includes accessing the information in response to determining that the program has the authority to access the information. The apparatus includes a memory comprising a privileged code. The privileged code is capable of receiving a request to protect selected information and indicating at least one physical address of a memory housing the information as at least one of read and write disabled. The privileged code is capable of receiving a request from a program to access the information. The privileged code is further capable of accessing the information in response to determining that the program has the authority to access the information.

19 Claims, 6 Drawing Sheets

OTHER PUBLICATIONS

Robin, John Scott; Irvine, Cynthia E.; *Analysis of the Intel Pentium's Ability to Support a Secure Virtual Machine Monitor* 17 pages.

Gareau, Jean; *Embedded x86 Programming Protected Mode*; XP-002242939, Apr. 1998, pp. 80-82, 84, 86, 88, 90, 92, 93.

Skousen, Alan; Miller, Donald; *Using a Single Address Space Operating System for Distributed Computing and High Performance*; XP-000859671, Feb. 10, 1999, pp. 8-14.

Takahashi, Masahiko; Kono, Kenji, Masuda, Takashi; *Efficient Kernel Support of Fine-Grained Protection Domains for Mobile Code*; XP-010340561; May 31, 1999, pp. 64-73.

Shinagawa, Takahiro; Kono, Kenji; Masuda, Takashi; *Exploiting Segmentation Mechanism for Protecting Against Malicious Mobile Code*; XP-002242937; May 17, 2000, title page and pp. 1-16.

\* cited by examiner

| PRIVILEGED INSTRUCTIONS ⟵330 | ACCESS ⟵325 |
|---|---|
| access to CR3 register | operating system access only |
| access to global descriptor table | operating system and device drivers access only |
| access to interrupt descriptor table register | global access |
| access to task register | operating system and device drivers access only |
| ••• | ••• |

| MEMORY LOCATION 515 | READ ONLY 520 | WRITE ONLY 530 | ACCESS RIGHTS 540 |
|---|---|---|---|
| 0 | | | |
| 1 | | | |
| ••• | ••• | ••• | |
| 1000 | | | OS |
| 1001 | | | OS |
| 1002 | | | OS |
| 1003 | | | OS |
| ••• | ••• | ••• | |

FIG. 5

METHOD AND APPARATUS FOR SECURING PORTIONS OF MEMORY

BACKGROUND OF THE INVENTION

1. Field of the Invention

This invention relates generally to security, and, more particularly, to a method and apparatus for securing portions of a memory within data processing systems.

2. Description of the Related Art

Microprocessors for personal computers are typically designed to provide a variety of hardware protection mechanisms that may be utilized by computer programmers. These protection mechanisms are often vital to the integrity and security of operating systems (OS) that run on the personal computers.

The architecture of x86 microprocessors, for example, provides a protection mechanism that operates at a segment and page level. The x86 microprocessor's segment-protection mechanism typically recognizes four privilege levels, numbered from zero to three, where the higher the privilege level, the lower the privilege. Thus, a software application having a privilege level of zero has the highest privilege, and typically has the full rights to substantially all of the resources. The x86 protection mechanism provides the ability to limit access to certain segments or pages based on privilege levels. For instance, critical operating-system code and data may be protected if placed in more privileged segments than those containing application code. The microprocessor's protection mechanism may allow application code to access the operating-system code and data only in a controlled, defined manner.

Operating systems, which generally operate at privilege level zero, utilize hardware protection mechanisms and the different privilege levels to protect resources under its control. It is not unusual for modem-day operating systems and the associated drivers to have over a million lines of code, which means that, in an x86 architecture, all of these lines of code would have complete access to all of the computer's resources. Not surprisingly, the large size and complexity of the existing and new operating systems have made it a challenging feat to maintain the integrity and security of the system. It is particularly difficult to insure that today's large and often complex operating systems are free of security defects (or other bugs). These security defects, in turn, place the resources managed by the operating system at risk, and open the entire operating system and platform to attacks from viruses or other malicious programs.

The x86 architecture, for example, does not provide a mechanism for both read and write protecting portions of the memory. Currently, page tables are utilized to offer write protection for selected regions of the memory, but no equivalent mechanism exists for read protecting those regions of the memory. It is therefore possible for a malicious program to create a new page table mapping to circumvent the write protection. That is, a program, operating at the zero privilege level, can access the protected memory region by first creating an alias page table that maps to the physical address of the protected memory region and then updating its table entry to make the protected memory region write enabled. The program can then access the memory region without authorization.

The present invention is directed to overcoming, or at least reducing the effects of, one or more of the problems set forth above.

SUMMARY OF THE INVENTION

In one aspect of the present invention, a method is provided for securing portions of a memory. The method includes identifying information for protection and indicating at least one physical address of a memory that houses the information as at least one of read and write disabled. The method includes receiving a request from a program to access the information. The method further includes accessing the information in response to determining that the program has the authority to access the information.

In another aspect of the instant invention, an apparatus is provided for securing portions of a memory. The apparatus includes a memory comprising a privileged code. The privileged code is capable of receiving a request to protect selected information and indicating at least one physical address of a memory housing the information as at least one of read and write disabled. The privileged code is capable of receiving a request from a program to access the information. The privileged code is further capable of accessing the information in response to determining that the program has the authority to access the information.

BRIEF DESCRIPTION OF THE DRAWINGS

The invention may be understood by reference to the following description taken in conjunction with the accompanying drawings, in which like reference numerals identify like elements, and in which:

FIG. 3 depicts a list of exemplary instructions that may be privileged in the computer system of FIG. 1;

FIG. 5 illustrates an exemplary table for protecting selected memory locations of the memory of the computer system of FIG. 1.

Figure 1:
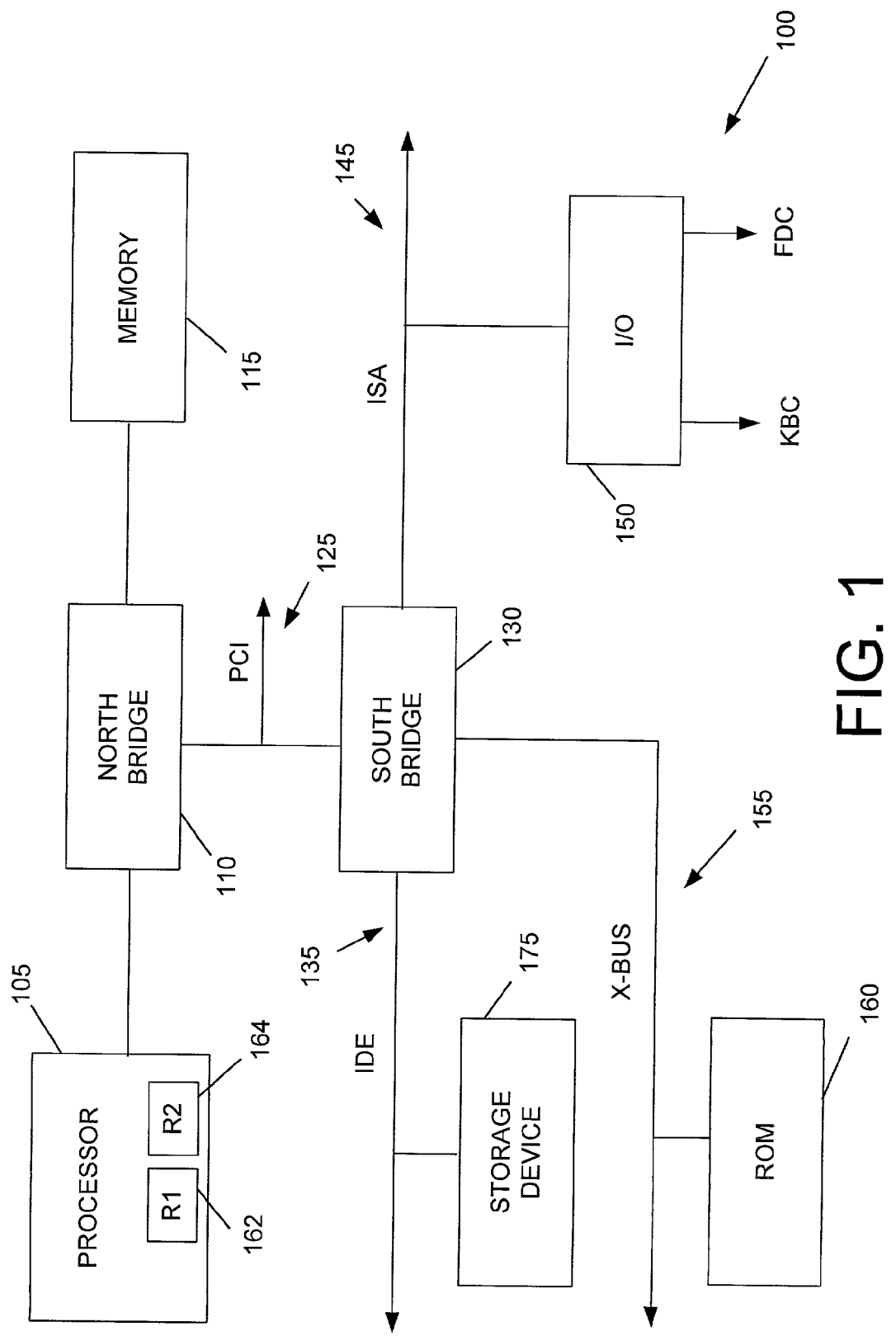
FIG. 1 illustrates a block diagram of an embodiment of a computer system in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring now to the drawings, FIG. 1 illustrates an exemplary computer system 100. The computer system 100 includes a processor 105, north bridge 110, memory 115, Peripheral Component Interconnect (PCI) bus 125, south bridge 130, AT Attachment (ATA) interface (more commonly known as an Integrated Drive Electronics (IDE) interface) 135, Industry Standard Architecture (ISA) bus 145, input/output controller chip 150, keyboard and mouse controller (KBC) interface, floppy disk controller (FDC) interface, X-bus 155, and read only memory (ROM) 160. The north bridge 110 and the south bridge 130 may be part of a single chip or a plurality of chips. Although not so limited, the processor 105 in the illustrated embodiment is an x86 processor. The architecture of the x86 processor is described in a document entitled "Intel Architecture Software Developer's Manual," Volume 3, which is incorporated herein by reference in its entirety.

The computer system 100 may include other buses, devices, and/or subsystems, depending on the implementation desired. For example, the computer system 100 may include caches, modems, parallel or serial interfaces, SCSI interfaces, network interface cards, and the like.

In the illustrated embodiment, the processor 105 includes first and second registers 162, 164 that define a region of memory where super-privileged code is stored. As is described in more detail below, the super-privileged code, in accordance with the present invention, comprises a set of computer instructions having a high security level that controls access to selected resources of the computer system 100.

The processor 105 is coupled to the north bridge 110. The north bridge 110 provides an interface between the processor 105, the memory 115, and the PCI bus 125. The south bridge 130 provides an interface between the PCI bus 125 and the peripherals, devices, and subsystems coupled to the IDE interface 135, the ISA bus 145, and the X-bus 155. The I/O interface 150 is coupled to the ISA bus 145.

The north bridge 110 provides communications access between and/or among the processor 105, memory 115, devices coupled to the PCI bus 125, and devices and subsystems coupled to the south bridge 130. Typically, removable peripheral devices are inserted into PCI "slots" (not shown) that connect to the PCI bus 125 to couple to the computer system 100. Alternatively, devices located on a motherboard may be directly connected to the PCI bus 125.

The south bridge 130 provides an interface between the PCI bus 125 and various devices and subsystems, especially legacy devices, such as a modem, a printer, keyboard, mouse, etc., which have generally been coupled to the computer system 100 through the X-bus 155, the ISA bus 145, and, more recently, the IDE interface 135. The south bridge 130 includes logic that interfaces the legacy devices to the rest of the computer system 100 through the IDE interface 135, the ISA bus 145, and the X-bus 155. A storage device 175, such as a hard drive, is coupled to the IDE interface 135. The storage device 175 may have one or more operating systems (OS), device drivers, and other applications stored therein. In an x86 architecture, the operating system and its associated device drivers typically operate at privilege level zero, allowing the OS and the device drivers to access a variety of the resources of the system 100. An example of the operating system that may be installed on the storage device 175 is Windows®, which is currently supported by Microsoft®. The Windows® operating system is generally shipped with a variety of device drivers for controlling the system 100 resources, such as device drivers for the storage device 175, I/O interface 150, and the like. Additionally, third-party device drivers may also be employed by the Windows® operating system.

The ROM 160 may contain a BIOS (basic input/output system), which manages data flow between the operating system running on the computer system 100 and attached devices such as the storage device 175, input/output interface 150, and the like. In one embodiment of the instant invention, the super-privileged code (SPC) may be stored in the ROM 160, so that the SPC initializes at substantially the same time as the BIOS when the computer system 100 is turned on. Although the super-privileged code is resident in the ROM 160 in the illustrated embodiment, it should be noted that the SPC may reside in other places as well, including in a local memory (not shown) of the processor 105, in the storage device 175, or any other suitable memory location from which the SPC may be executed. In an alternative embodiment, the SPC may be implemented as a portion of the operating system, in which case the SPC will most likely be stored in the storage device 175.

Figure 2:
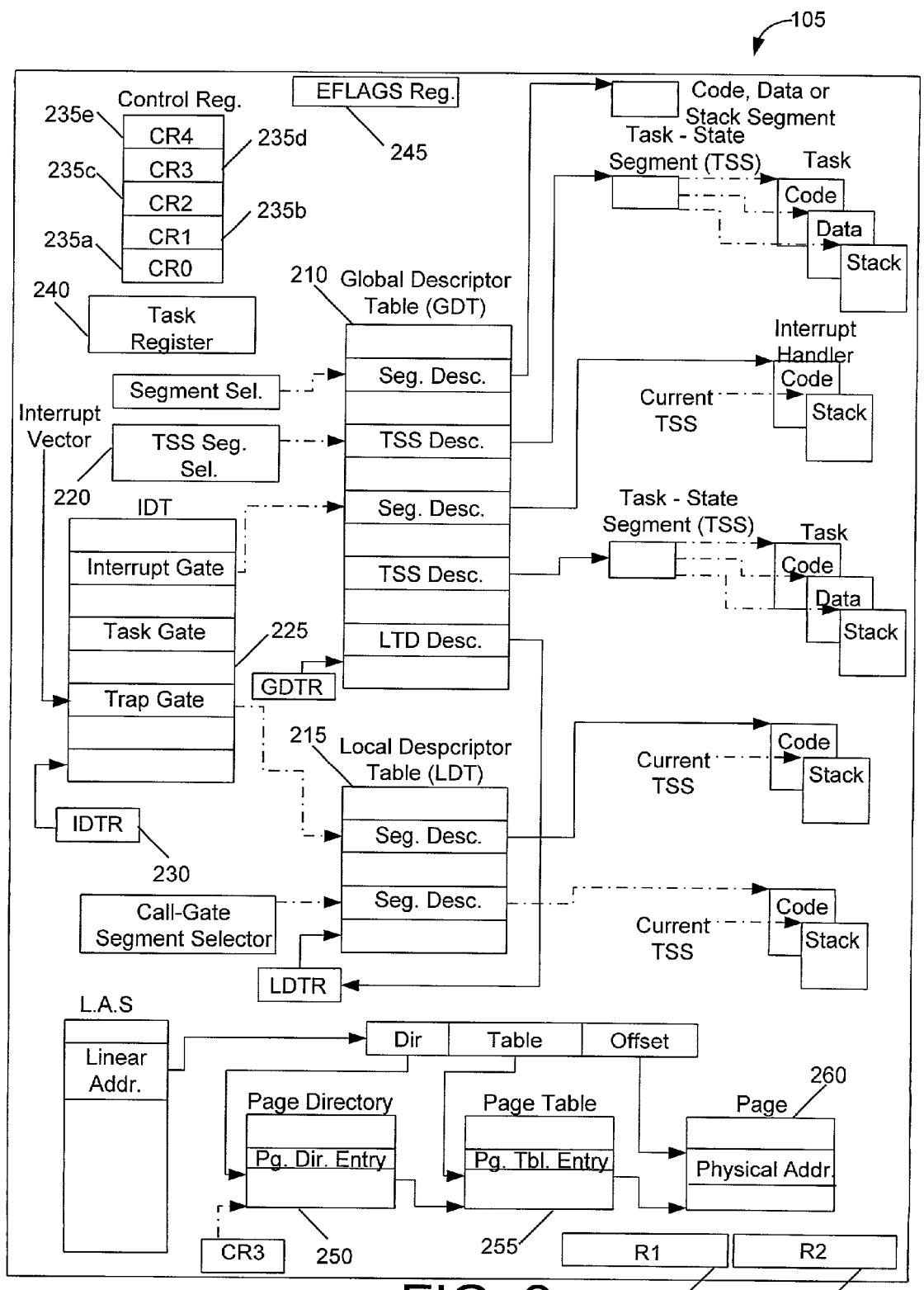
FIG. 2 depicts one embodiment of a processor that may be employed in the computer system of FIG. 1.

Referring now to FIG. 2, a specific embodiment of the processor 105 is illustrated. In particular, in FIG. 2 the processor 105 is an x86 processor. The x86 architecture of the processor 105 supports a plurality of operating modes, including protected mode, real-address mode, and system management mode. The protected mode is the native operating mode of the processor 105. In the protected mode, all instructions and features of the processor 105 are available. The real-address mode provides a programming environment of the Intel® 8086 processor, and the system management mode provides an operating system with a transparent mechanism for implementing power management and OEM differentiation features.

As shown in FIG. 2, the processor 105 includes a global descriptor table (GDT) 210, local descriptor table (LDT) 215, task-state segment (TSS) 220, interrupt descriptor table (IDT) 225, IDT register 230, five control registers 235($a$-$e$), and task register 240. Substantially all memory accesses pass through either the GDT 210 or the (optional) LDT 215 when operating in the protected mode. The GDT and LDT 210, 215 contain entries called segment descriptors. A segment descriptor provides a base address of a segment and access rights, type, and usage information. Each segment descriptor has an associated segment selector that provides an index into the GDT or LDT 210, 215.

The TSS 220 defines the state of the execution environment for a task. The TSS 220 includes a state of the general-purpose registers (not shown), the segment registers, an EFLAGS register 245, segment selectors, and stack pointers for three stack segments (one stack each for privilege levels 0, 1, and 2). The TSS 220 also includes a segment selector for the LDT 215 associated with the task and the page-table base address.

The task register 240 holds a segment selector, base address, a segment limit, and descriptor attributes for the TSS 220 of the current task. The task register 240 references a TSS descriptor in the GDT 210, where the base address specifies the linear address of the TSS 220, the segment limit specifies the number of bytes in the TSS 220. The LTR and STR instructions load and store the segment selector portion of the task register 240, respectively. When the LTR instruction loads a segment selector in the task register 240, the base address, limit, and descriptor attributes from the TSS descriptor are automatically loaded into the task register 240. When a task switch occurs, the task register 240 is automatically loaded with the segment selector and descriptor for the TSS 220 for the new task. The contents of the task register 240 are not automatically saved prior to writing the new TSS information into the register 240.

The IDT 225 handles external interrupts, software interrupts, and exceptions. The IDT 225 contains a collection of gate descriptors, which provide access to interrupt and exception handlers. The gate descriptors in the IDT 225 can be of the interrupt-gate, trap-gate, or task-gate type. The processor 105 accesses an interrupt or exception handler upon receiving an interrupt vector from internal hardware, an external interrupt controller, or from software. Like the GDT 210, the IDT 225 is not a segment. The linear address of the base of the IDT 225 is contained in the IDT register (IDTR) 230.

The control registers 235(a-e) determine the operating mode of the processor 105 and the characteristics of the currently executing task. The control registers 235(a-e) contain a variety of flags and data fields for controlling system-level operations. Specifically, the CR0 register 235a contains system control flags that control the operating mode and states of the processor 105. The CR1 register 235b is reserved. The CR2 register 235c comprises the page-fault linear address. The CR3 register 235d, which is often also referred to as the page-directory base register, includes the physical address of the base of the page directory 250 and two flags. The two flags control caching of the page directory 250 in the internal data caches (not shown) of the processor 105. The CR4 register 235e contains a group of flags that enable several architectural extensions.

The x86 architecture of the processor 105 is capable of supporting direct physical addressing of memory 115 (see FIG. 1) or virtual memory (through paging). When physical addressing is utilized, a linear address is treated as a physical address. When paging is utilized, substantially all of the code, data, stack, and system segments and the GDT and IDT 210, 215 may be paged.

The location of pages in physical memory 115 is contained in up to four types or levels of system data structures. The base physical address of the paging data is contained in control register CR3 235d. For paging, the linear address is broken into multiple parts, providing separate offsets into each of the respective paging table, and a page frame 260. In one exemplary embodiment illustrated in FIG. 2, a two-level system data structure is described. An entry in a page directory 250 contains the physical address of a base of a page table 255, access rights, and memory management information. An entry in the page table 255 contains the physical address of a page frame, access rights, and memory management information. The base physical address of the page directory 250 is contained in control register CR3 235d. In the exemplary embodiment of FIG. 2 for paging, a linear address is broken into three parts, providing separate offsets into the page directory 250, the page table 255, and the page fame 260.

In accordance with the present invention, the SPC comprises a series of "super privileged" instructions that may be executed by calling programs having access to such instructions. The term "program" is utilized herein as a general term for a logical unit or block of code, such as a procedure, function, routine, and the like. Thus, for example, the "program" may be an operating system or any other application. Limited access to selected SPC instructions adds a level of security to the computer system 100 that is not otherwise present in current systems. That is, with the advent of the instant invention, programs (e.g., operating systems, associated device drivers) operating at the zero privilege level do not automatically gain access to the system 100 resources. Instead, as described in more detail below, the SPC of the instant invention may selectively grant different privileges to different programs operating at the zero privilege level.

FIG. 3 illustrates a list of exemplary "super privileged" instructions 330 and the associated access rights 325 granted to programs having the authority to invoke these instructions. For example, entry 350 depicts only the operating system as having the authority to access the CR3 register 235d. Thus, if the operating system attempts to access the CR3 register 235d, the SPC will allow the access to be completed, while requests to access the CR3 register 235d by programs other than the OS will be denied. The mechanism by which the SPC allows selected programs to execute the super privileged instructions 330 is described in more detail with respect to FIG. 4 below.

It should be noted that the access rights depicted in FIG. 3 are for illustrative purposes only. Those skilled in the art will appreciate that the access rights 325, and the selected privileged instructions 330, may be implementation-specific, and may thus vary from one implementation to another. Entry 360 illustrates the OS and its associated device drivers having access to the GDT 210, while entry 365 illustrates that any application operating at the zero privilege level has access to the IDTR 230. Entry 370 depicts the OS and the device drivers having access to the task register 240.

Figure 4:
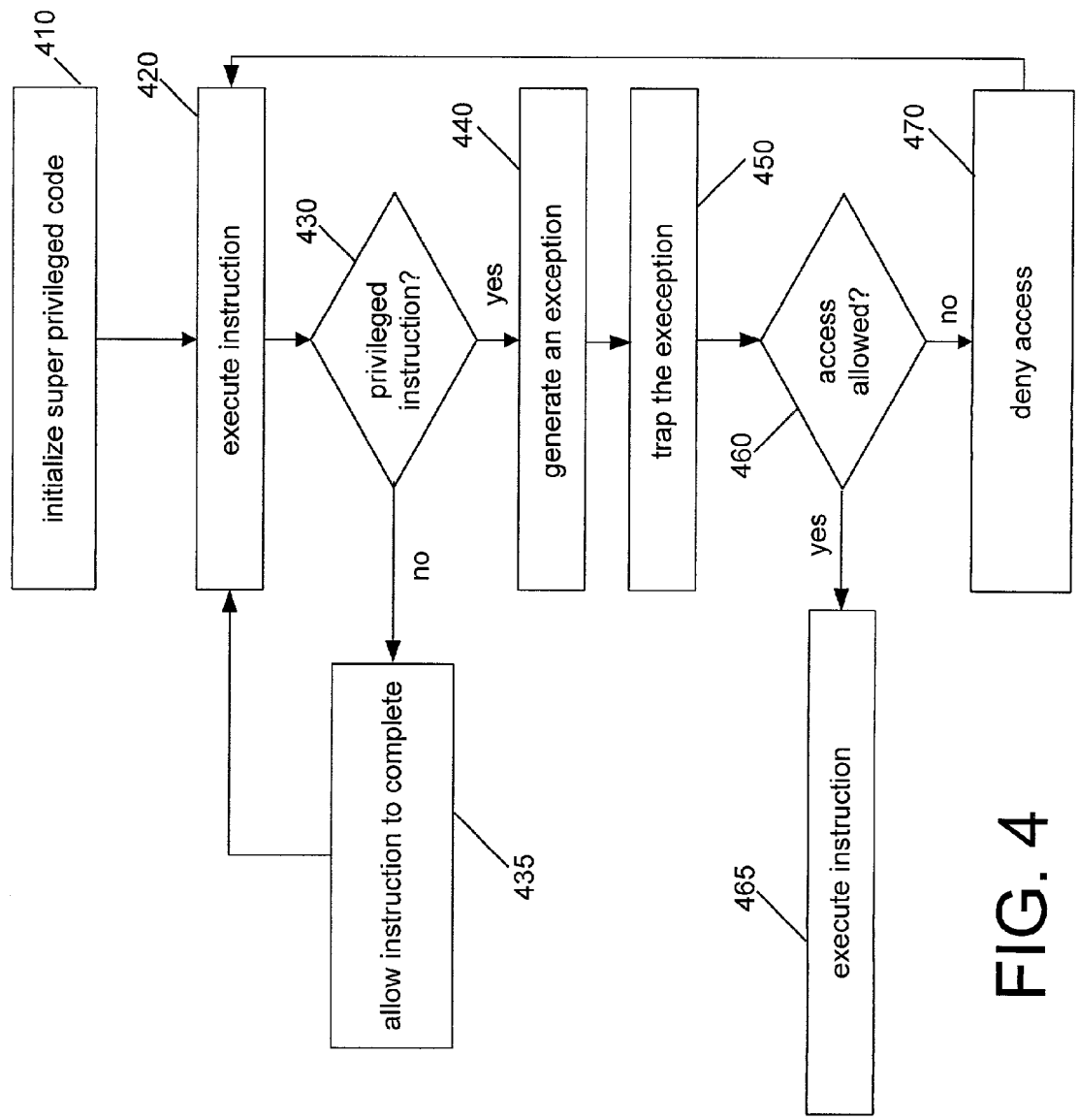
FIG. 4 illustrates a method in accordance with the present invention that may be employed by the computer system of FIG. 1.

FIG. 4 illustrates a method that may be employed by the computer system 100 of FIG. 1. The method of FIG. 4 begins at block 410, where the SPC initializes when the computer system 100 is turned on. During initialization, the SPC writes to the first and second registers 162, 164 of the processor 105 to define a protected memory region that houses the SPC. It should be noted that in an alternative embodiment, instead of two registers 162, 164, it is possible to define the protected memory region using one register. That is, a single register may be utilized to identify the starting address of the memory region, while a preselected offset value may be utilized to define the ending address of the memory region that houses the SPC.

The two registers 162, 164, once written, define the protected memory region where the SPC resides. The protected memory region may be defined in the memory 115, in the ROM 160, or any other storage area from which SPC may be executed. If the registers are programmed to point to a memory region in the memory 115, the SPC then copies itself to the protected memory region defined by the two registers 162, 164, where the SPC is shielded from all other programs. In an alternative embodiment, the SPC may program the two registers 162, 164 to simply point to the ROM 160, the location where the SPC initially resides. In this case, the SPC may thereafter execute directly from the ROM 160, although for faster performance it may be desirable to execute the SPC from the memory 115.

At block 420, when a program (e.g., an operating system) attempts to execute an instruction, the processor 105, at block 430, determines if the instruction is one of the selected privileged instructions (see FIG. 3-330) that is part of the SPC. If the instruction is not one of the privileged instructions 330, then, at block 435, the processor 105 allows the instruction to complete. If, however, the instruction being executed by the program is one of the privileged instructions 330, then, at block 440, the processor 105 generates an exception. At block 450, the SPC traps the exception that is generated by the processor 105.

At block 460, the SPC determines if the program attempting to execute the privileged instruction has proper access rights. Access rights to the calling programs may be granted on a program-by-program basis, as shown in FIG. 3, for example. To identify the calling program, the SPC, in one embodiment, references the stack based on the address of the calling program. Alternatively, publicly available debuggers, such as Soft-Ice, may be employed to authenticate the location of the calling program. If the call originates from a program authorized to execute the privileged instruction, the SPC, at block 465, executes the privileged instruction.

The SPC is able to authenticate the calling program based on the program's signatures, installed perhaps during installation of the calling program. For example, assuming that the calling program is the operating system, then signatures of the operating system, generated presumably during installation, may later be utilized to authenticate calls made by the operating system.

If, at the block 460, the SPC determines the calling program does not have access to the privileged instruction, then, at block 470, the request is denied. Access to privileged instructions may be denied for several reasons. First, if the calling program does not have access rights to the privileged instructions, then the calling program's request to execute the privileged instruction may be denied. Second, access to privileged instructions may be denied if the SPC cannot verify the authenticity of the calling program. That is, even though the calling program may have access rights to invoke the privileged instruction, its request may nevertheless be denied if the SPC cannot verify, using the stack, that it is in fact the authorized calling program (as opposed to malicious code masquerading as the calling program) that is attempting to execute the privileged instruction.

To better illustrate the method of FIG. 4, an example is herein provided. Assume for illustrative purposes that, at the block 420, the operating system attempts to modify the CR3 register 235d. Furthermore, for the purposes of this illustration, assume that the SPC comprises the privileged instructions 330 of FIG. 3, and assume that the programs listed in FIG. 3 have the access rights 325 to the privileged instructions 330. At the block 430, the processor 105 determines if accessing the CR3 register 235d is a privileged instruction, and since, according to FIG. 3, it is, the processor 105 generates an exception at the block 440. At the block 450, the SPC traps the exception that was generated, at the block 440, by the processor 105.

The SPC then, at the block 460, determines if the operating system (i.e., the calling program) has access rights to modify the CR3 register 235d. Before allowing the CR3 register 235d to be modified, the SPC first attempts to verify that the initial request to modify the CR3 register 235d was in fact by the operating system. One method of authenticating the operating system's request is to reference the stack. If the address from the stack confirms that it is in fact the operating system that issued the request to modify the CR3 register 235d, then, at the block 465, the SPC executes the instruction to modify the CR3 register 235d. When the SPC executes the instruction to modify the CR3 register 235d, the processor 105 will complete the request without generating an exception because the request is being provided by the SPC, which is authorized to modify the privileged instruction.

In accordance with the present invention, the processor 105 maintains a read/write protection table based on physical addresses of the memory. An exemplary read/write protection table 510 is illustrated in FIG. 5. The super-privileged code updates the read and write protection indicators associated with the memory addresses of the protection table 510. In one embodiment, the protection table 510 may be a read/write protection bitmap.

FIG. 5 illustrates that each physical address location 515 of the memory 115 includes a read field 520, a write field 530, and an access field 540, although those skilled in the art may appreciate that other embodiments may employ additional or fewer fields, depending on the implementation. The read field 520 indicates if the respective memory address 515 is read enabled or disabled, while the write field 530 indicates if the respective memory location 515 is write enabled or disabled. The access field 540 identifies the programs that are authorized to access the respective memory location 515. For example, memory locations 1000-1003 may be accessed only by the operating system. Although FIG. 5 illustrates each memory location 515 having a respective read field 520, write field 530, and access field 540 associated with that memory location 515, it is herein envisioned that such fields may also be associated with a block of memory locations, rather than with individual memory locations.

Figure 6:
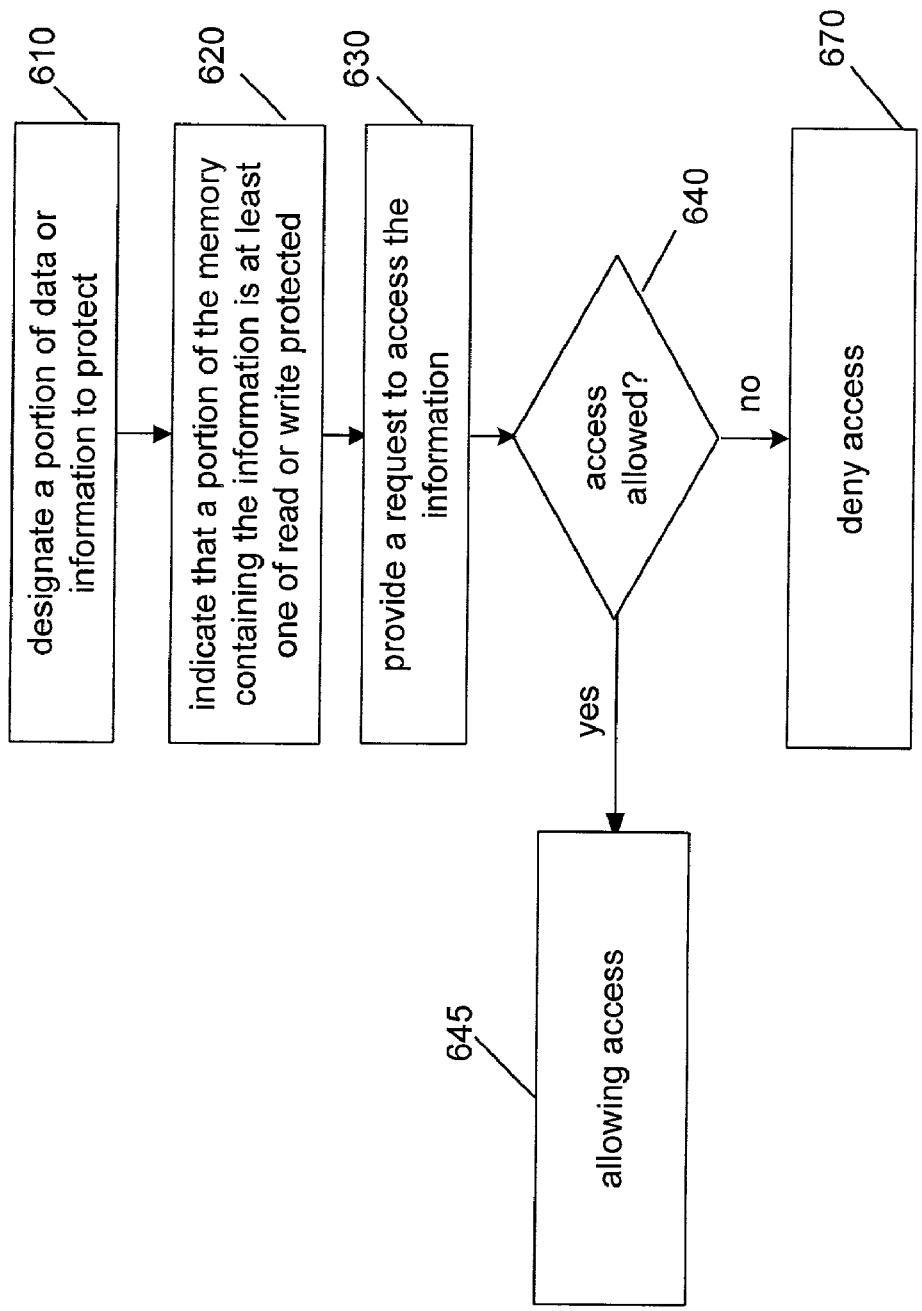
FIG. 6 illustrates a method in accordance with the present invention that may be employed by the computer system of FIG. 1.

The method of FIG. 6 may be employed by the system 100 (see FIG. 1) to protect selected regions of the memory 115. The method of FIG. 6 begins at block 610, where the program (e.g., operating system, device driver) designates a selected portion of data or information for protection. In one example, the operating system (i.e., the program) may identify the region of memory housing the IDT 225 as requiring protection. To protect the IDT 225, the operating system requests the SPC to mark the relevant memory locations 515 housing the IDT 225 as either read disabled, write disabled, or both, depending on the type of protection sought.

At block 620, the SPC updates the protection table 510 (see FIG. 5) corresponding to a region of the memory 115 that houses the data or information sought to be protected by the program. That is, the SPC marks the memory region as read disabled, write disabled, or both. In one embodiment, only the SPC is allowed to modify the protection table 510, thereby preventing unauthorized programs, such as viruses, from gaining access to protected regions of the memory 115. In an alternative embodiment, the SPC allows the programs having access rights to the protected memory region to directly modify the protection table 510. For example, in FIG. 5, since the operating system has access to memory locations 1000-1003, the SPC will allow the operating system to modify the read and write access rights for these locations 515. The SPC can verify that it is in fact the operating system (as opposed to some malicious program) that seeks to modify the protection table using the stack, as described earlier.

At block 630, a program requests access to the protected memory location 515, and, at block 640, the SPC determines if the program has access to the protected memory location 515. If the memory location is read and write disabled, then the calling program can neither write nor read the contents of the protected memory location 515. The read protection prevents a malicious program from accessing the protected memory, even if the program attempts to create an alias page table entry to map to the protected memory location 515.

If, at the block 640, the SPC determines that the calling program does not have access to the protected memory, then at block 640 the SPC denies the request. If, at the block 640, the SPC determines that the calling program has access, then the SPC allows the access to complete. The access rights, in one embodiment, may be defined as shown in FIG. 5.

Assigning access rights to memory locations 515, or, alternatively to memory regions, allows the instant invention to prevent unauthorized memory access. Programs can no longer readily circumvent the existing security mechanisms by creating alias page tables and marking the associated memory as write enabled. By controlling access at the physical level, the instant invention makes it difficult for programs to gain unauthorized access by first mapping virtual pages to the protected memory location and then indicating in the alias page table entry that the protected memory is write enabled.

A variety of tables, such as the IDT, GDT, LDT, may be protected by the instant invention. Additionally, other features such as encryption keys and the like may also be protected by the instant invention.

It will be appreciated by those of ordinary skill in the art having the benefit of this disclosure that numerous variations from the foregoing illustration will be possible without departing from the inventive concept described herein. Accordingly, it is the claims set forth below, and not merely the foregoing illustration, which are intended to define the exclusive rights of the invention.

What is claimed:

1. A method for providing security in a computer system, comprising:
    controlling access to selected information using attributes defined in a first table;
    controlling access to the selected information using a second table that associates at least one of a read and write privilege with one or more physical addresses of a memory that houses the selected information;
    receiving a request from a program to access the information; and
    allowing access to the information in response to determining that the program has the authority to access the information based on at least one of the read and write privilege; and
    wherein the selected information is at least one of interrupt descriptor table, global descriptor table, and local descriptor table.

2. The method of claim 1, wherein controlling access to the selected information based on the privilege comprises:
    indicating in the second table that the memory housing the information is at least one of read and write disabled.

3. The method of claim 2, wherein the second table is a bitmap based on physical addresses of the memory.

4. The method of claim 1, wherein the program is an operating system.

5. The method of claim 1, wherein allowing access to the information in response to determining that the program has the authority to access the information includes using a stack in the computer system to verify the identity of the program.

6. A method for providing security, comprising:
    writing to at least one register to define a privileged memory region;
    defining at least one computer instruction as a privileged instruction, wherein the privileged instruction is resident in the privileged memory region;
    identifying information for protection;
    indicating at least one physical address of a memory that houses the information as at least one of read and write disabled; and
    controlling the access to the information using the privileged instruction; and
    wherein the protected information is at least one of interrupt descriptor table, global descriptor table, and local descriptor table.

7. The method of claim 6, further including writing to a second register, wherein the first and second registers define the privileged memory region.

8. The method of claim 6, wherein indicating at least one physical address of the memory includes:
    generating a table based on the physical addresses of the memory; and
    indicating in the table that the memory housing the information is at least one of read and write disabled.

9. A computer readable program storage device encoded with instructions that, when executed by a computer, performs a method of providing security, comprising:
    protecting selected information using a first level of security specifying access privileges to the selected information;
    protecting the information using a second level of security that associates at least one of a read and write privilege with one or more physical addresses of a memory that houses the selected information;
    receiving a request from a program to access the selected information; and
    accessing the information in response to determining that the program has the authority to access the selected information based at least on the second security level; and
    wherein the selected information is at least one of interrupt descriptor table, global descriptor table, and local descriptor table.

10. The computer readable program storage device of claim 9, wherein indicating at least one physical address of the memory includes:
    generating a table based on the physical addresses of the memory; and
    indicating in the table that the memory housing the information is at least one of read and write disabled.

11. The computer readable program storage device of claim 10, wherein the table includes an entry specifying access rights to the selected information based on one or more programs desiring to access the selected information.

12. An apparatus, comprising:
    a memory comprising:
    a first level of protection specifying access privileges for selected information; and
    a privileged code, the privileged code capable of:
        protecting access to the selected information based on a second level of protection in which at least one of a read and write privilege is associated with the physical address of a memory housing the information;
        receiving a request from a program to access the information; and
        allowing access to the information in response to determining that the program has the authority to access the information based on at least one of the read and write privilege, wherein the selected information is at least one of interrupt descriptor table, global descriptor table, and local descriptor table.

13. The apparatus of claim 12, wherein the privileged code capable of indicating at least one physical address of the memory includes the privileged code being capable of:
    generating a table based on the physical addresses of the memory; and
    indicating in the table that the memory housing the information is at least one of read and write disabled.

14. The apparatus of claim 12, wherein the program is an operating system.

15. A system, comprising:
    a processor; and
    a memory coupled to the processor, the memory comprising:
    a table specifying access privileges for selected information; and
    a privileged code capable of:
        protecting access to the selected information based a second table specifying association of at least one of a read and write privilege with at least one physical address of a memory housing the information;

receiving a request from a program to access the information; and allowing access to the information in response to determining that the program has the authority to access the information based on at least one of the read and write privilege, wherein the selected information is at least one of interrupt descriptor table, global descriptor table, and local descriptor table.

16. The system of claim 15, wherein the privileged code capable of indicating at least one physical address of the memory includes the privileged code being capable of:

generating a table based on the physical addresses of the memory; and indicating in the table that the memory housing the information is at least one of read and write disabled.

17. The system of claim 15, wherein the program is an operating system.

18. The system of claim 15, wherein the processor is an x86 processor.

19. An apparatus for providing security, comprising:

means for providing a first table of at least write protection for selected information;

means for providing a second table of at least one of read and write protection for the selected information associated with one or more physical addresses of a memory that houses the selected information;

means for receiving a request from a program to access the information; and means for allowing access to the information in response to determining that the program has the authority to access the information based on at least the first and second tables, wherein the selected information is at least one of interrupt descriptor table, global descriptor table, and local descriptor table.

* * * * *